United States Patent
Lu et al.

(10) Patent No.: US 12,055,112 B2
(45) Date of Patent: Aug. 6, 2024

(54) SYSTEM AND METHODS FOR AUTOMATICALLY STARTING AN ENGINE

(71) Applicant: Ford Global Technologies, LLC, Dearborn, MI (US)

(72) Inventors: Chenliu Stephen Lu, Northville, MI (US); Cary Cole, Wixom, MI (US); Jonathan Barker, Detroit, MI (US); Jared King, Southfield, MI (US); Chad Archer, Westland, MI (US); Jeremy Palko, Windsor (CA); Matthew Ryan Preston, Whitmore Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/812,555

(22) Filed: Jul. 14, 2022

(65) Prior Publication Data

US 2024/0018920 A1   Jan. 18, 2024

(51) Int. Cl.
*F02D 41/00* (2006.01)
*F02D 41/04* (2006.01)

(52) U.S. Cl.
CPC ........ *F02D 41/042* (2013.01); *F02D 2200/06* (2013.01); *F02D 2200/50* (2013.01)

(58) Field of Classification Search
CPC .......................... F02D 41/042; F02D 2200/06
See application file for complete search history.

(56) References Cited

U.S. PATENT DOCUMENTS

| | | | | |
|---|---|---|---|---|
| 7,689,335 | B2 * | 3/2010 | Kaita | F02N 11/10 |
| | | | | 477/2 |
| 7,869,932 | B2 * | 1/2011 | Boesch | F02N 11/0829 |
| | | | | 123/497 |
| 11,060,464 | B2 * | 7/2021 | Christensen | F02D 37/02 |
| 2011/0066359 | A1 * | 3/2011 | Lin | F02N 11/0833 |
| | | | | 701/112 |
| 2015/0315991 | A1 * | 11/2015 | Miura | F02D 41/08 |
| | | | | 701/104 |
| 2021/0387623 | A1 * | 12/2021 | Yetukuri | G08G 1/16 |

* cited by examiner

*Primary Examiner* — Phutthiwat Wongwian
*Assistant Examiner* — Sherman D Manley
(74) *Attorney, Agent, or Firm* — David Kelley; McCoy Russell LLP

(57) ABSTRACT

Systems and methods for operating a vehicle that includes an engine that may be automatically stopped and started are described. In one example, inhibiting of automatic engine stopping and starting may be based on comparing an engine off opportunity and a plurality of auxiliary logic performances. The plurality of auxiliary logic performances may be based on a plurality of auxiliary control routine blocks.

15 Claims, 7 Drawing Sheets

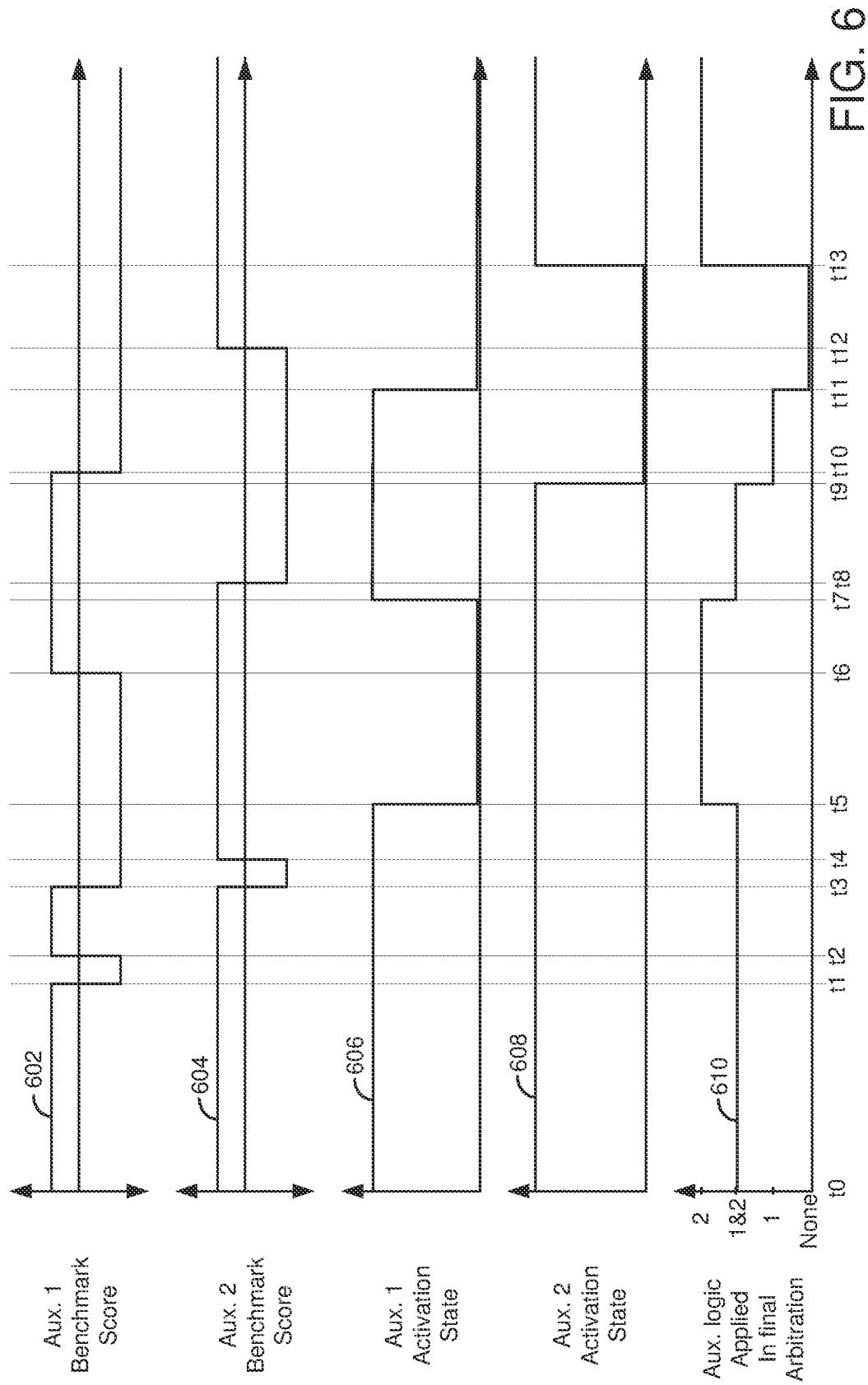

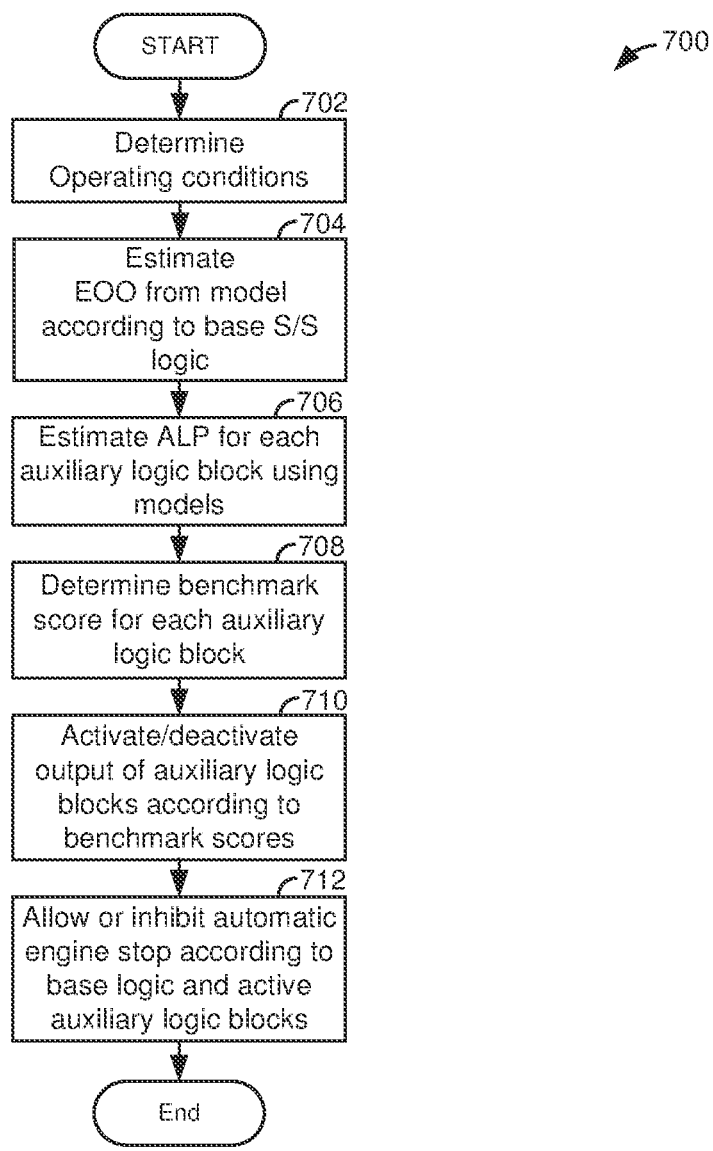

SYSTEM AND METHODS FOR AUTOMATICALLY STARTING AN ENGINE

FIELD

The present description relates to methods and a system for operating an engine that may be automatically stopped and started to conserve fuel. The methods and systems control selection of logic that determines whether or not to automatically stop the engine.

BACKGROUND AND SUMMARY

An internal combustion engine of a vehicle may be selectively automatically stopped and started to conserve fuel. The engine may be stopped via a controller in response to many vehicle operating conditions without receiving a specific request to stop the engine from a human driver or occupant of the vehicle. The controller may include algorithms to judge whether or not the engine is to be automatically stopped based on sensed operating conditions and learned driver behavior. However, the complexity of these algorithms may make it difficult to validate that the algorithms are as well behaved. In addition, even if the controller automatically starts and stops an engine in a way that vehicle occupants find acceptable, it may not make sense economically or environmentally to stop or refrain from stopping the engine as performed by the controller. Further, while the algorithm may work well for one driving style, it may not work as well for other driving styles.

The inventors herein have recognized the above-mentioned issues and have developed a method for operating an engine, comprising: providing a plurality of auxiliary control routine blocks and selectively inhibiting an output of each of the plurality of auxiliary control routine blocks from influencing an automatic engine stop decision generated via an arbitration routine; and inhibiting or permitting automatic stopping of the engine according to the automatic engine stop decision generated via the arbitration routine.

By selectively considering vehicle operating conditions according to an auxiliary control routine block, it may be possible to reduce or eliminate engine stopping events that may not be beneficial for vehicle operation. In particular, influence of an auxiliary control routine block to automatically stop an engine may be cancelled or removed when it is determined that the auxiliary control routine block does not provide a desirable benefit or level of performance. However, if at a later time the auxiliary control routine block is expected to provide a desired level of benefit or performance for the vehicle, the auxiliary control routine block may be permitted to once again influence an automatic engine stop decision. In this way, an auxiliary control routine block may be isolated from an engine stop decision if the auxiliary control routine block fails to deliver a desired level of performance or benefit. Accordingly, a desired level of performance for an active auxiliary control routine block may be provided.

The present description may provide several advantages. In particular, the approach may improve performance of automatic engine stop/start systems. Further, the approach may allow a desired level of vehicle emissions to be provided via the automatic engine stop/start system. In addition, the approach may allow a desired level of fuel conservation to be provided via the automatic engine stop/start system.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where:

FIG. 6 is an example sequence that shows how auxiliary control routine blocks may be managed to control automatic engine stopping according to the method of FIG. 7; and FIG. 7 shows a method for managing auxiliary automatic engine stop/start routines.

DETAILED DESCRIPTION

Figure 3:
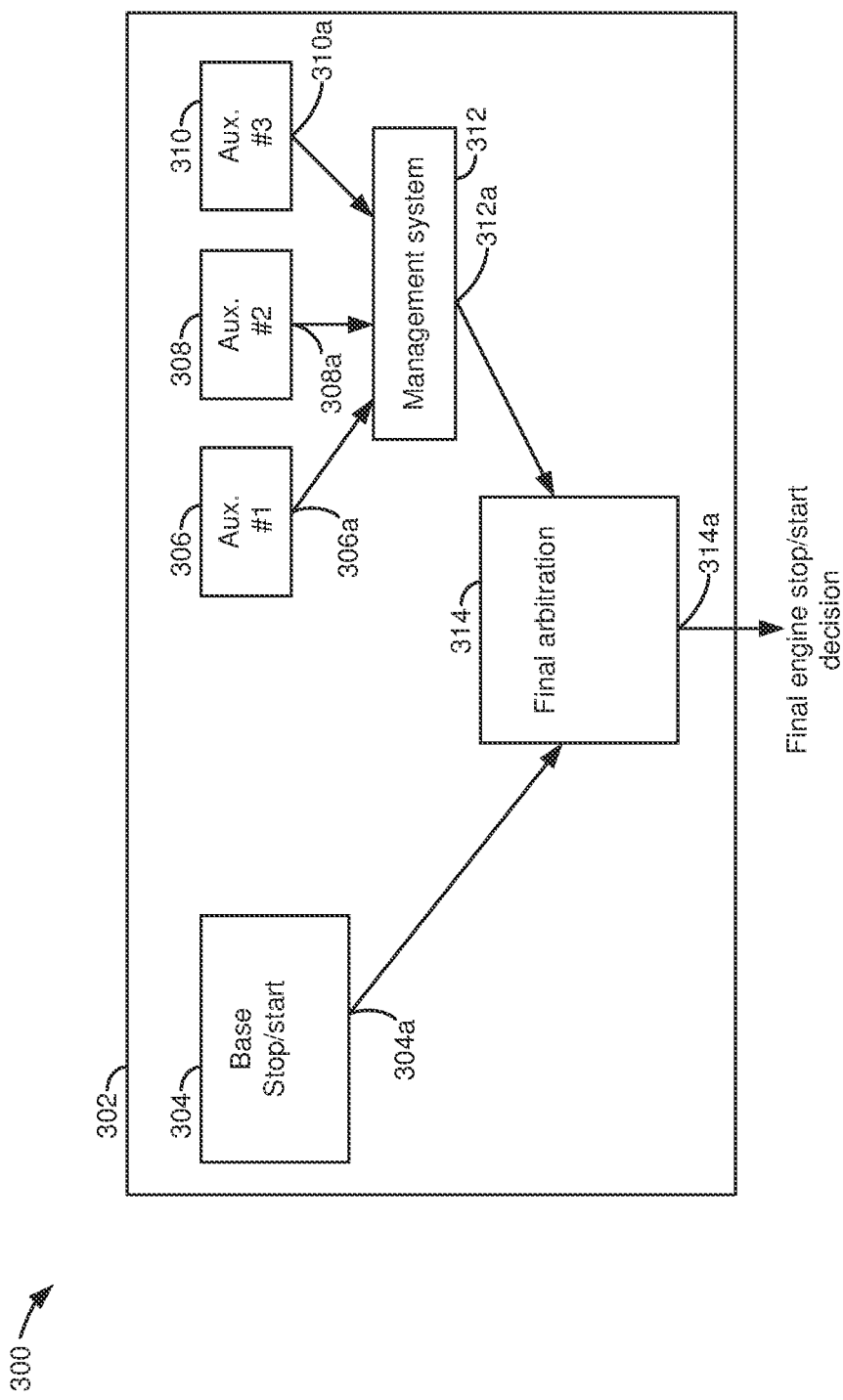
FIG. 3 shows a block diagram of blocks of software for an automatic engine stop/start system.
Figure 4:
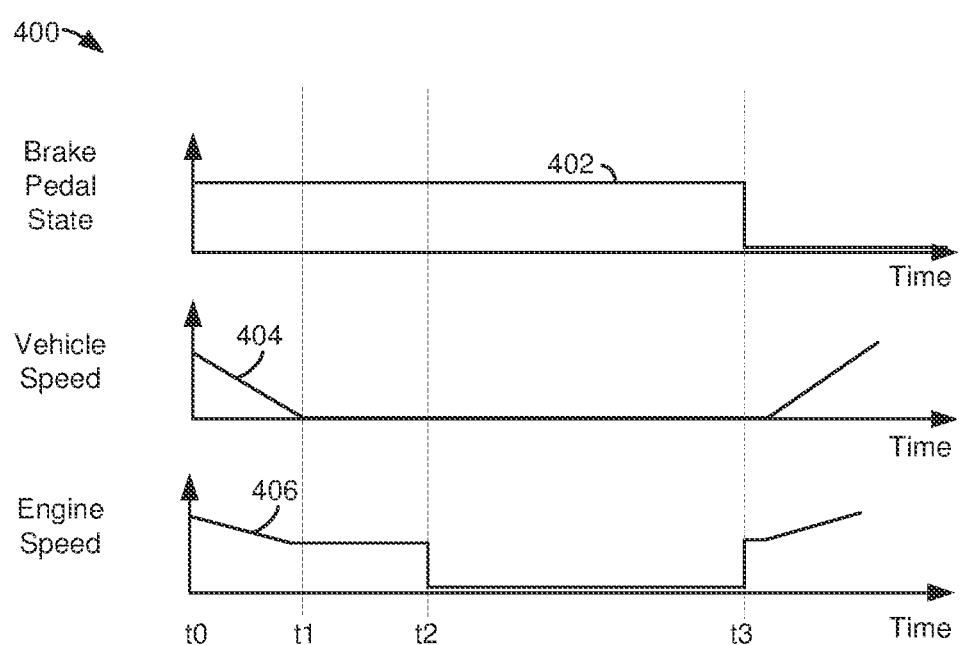
FIG. 4 is a plot showing an engine off opportunity and auxiliary logic performance.
Figure 5A:
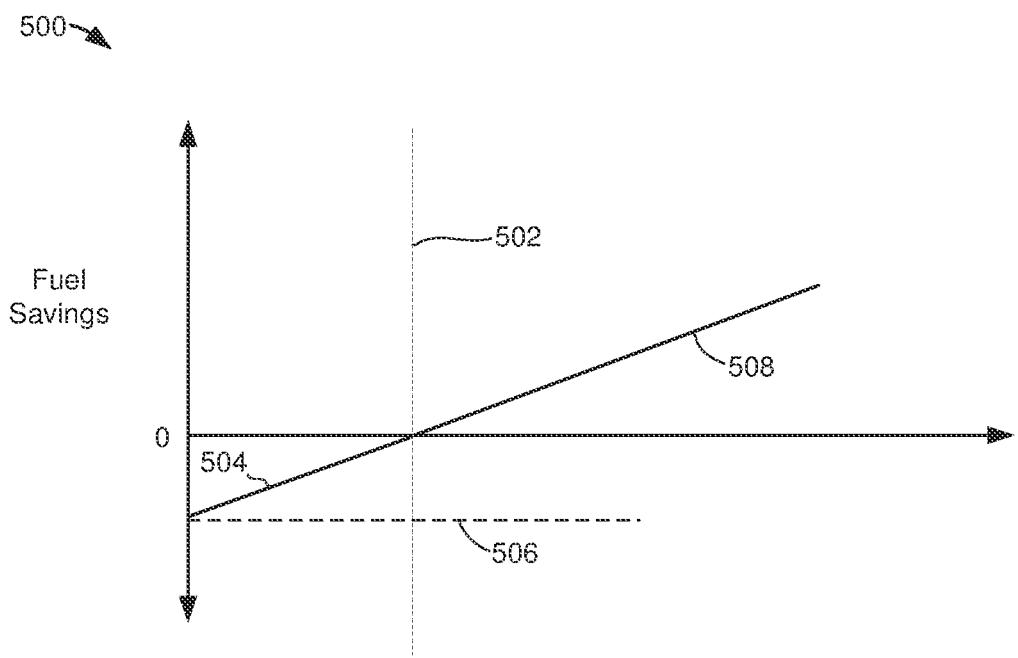
FIGS. 5A and 5B are plots that show emissions and fuel economy savings as a function of engine stop time.
Figure 5B:
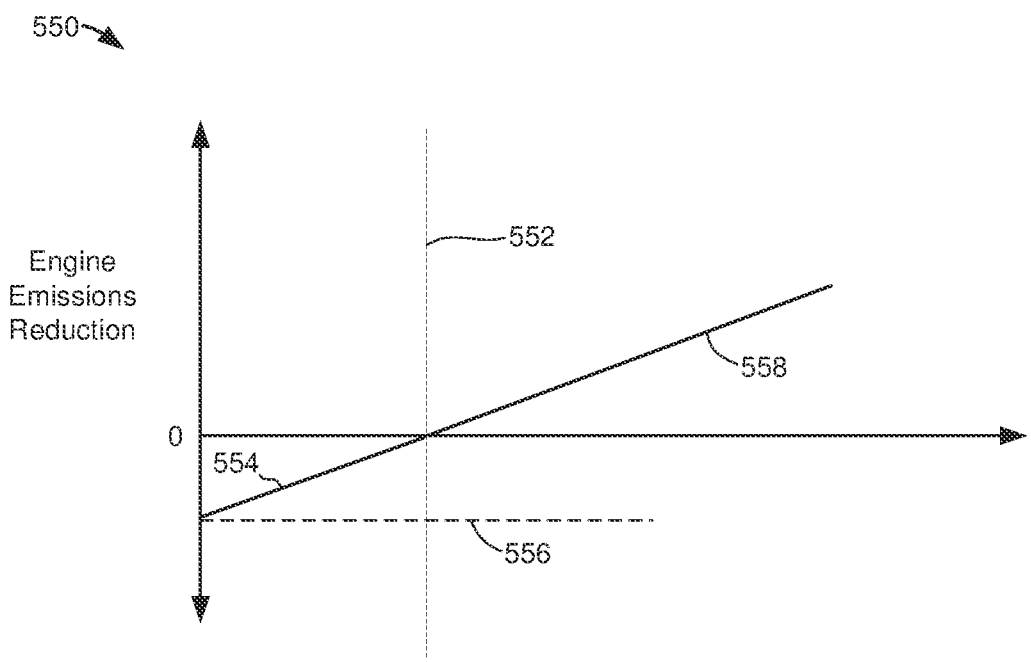

The present description is related to managing an automatic engine stop system. Individual auxiliary control routine blocks may be selectively applied as inputs to an arbitration routine that makes a decision whether or not to automatically stop an engine of a vehicle. An individual auxiliary control routine block may be applied to influence the decision to automatically stop the engine when the individual auxiliary control routine block is determined to be provide desirable vehicle control outcomes, such as lower fuel consumption and/or lower vehicle emissions. However, if the individual auxiliary control routine block is determined or forecast to provide undesirable vehicle control outcomes, the individual auxiliary control routine block may be removed from the process of deciding whether or not to automatically stop the engine. The engine may be of the type shown in FIG. 1 and the engine may be included in a vehicle of the type shown in FIG. 2. Of course, the systems and methods described herein may be applied to other types of engines and vehicles. Automatic engine stopping decisions may be made via blocks of software as shown in FIG. 3. An evaluation of performance of auxiliary control routine blocks may be based on metrics as shown in FIG. 4. FIGS. 5A and 5B show example plots for evaluating performance of auxiliary control routine blocks. An example vehicle operating sequence according to the method of FIG. 7 is shown in FIG. 6. An example method for managing automatic engine stop/start control is shown in FIG. 7.

Figure 1:
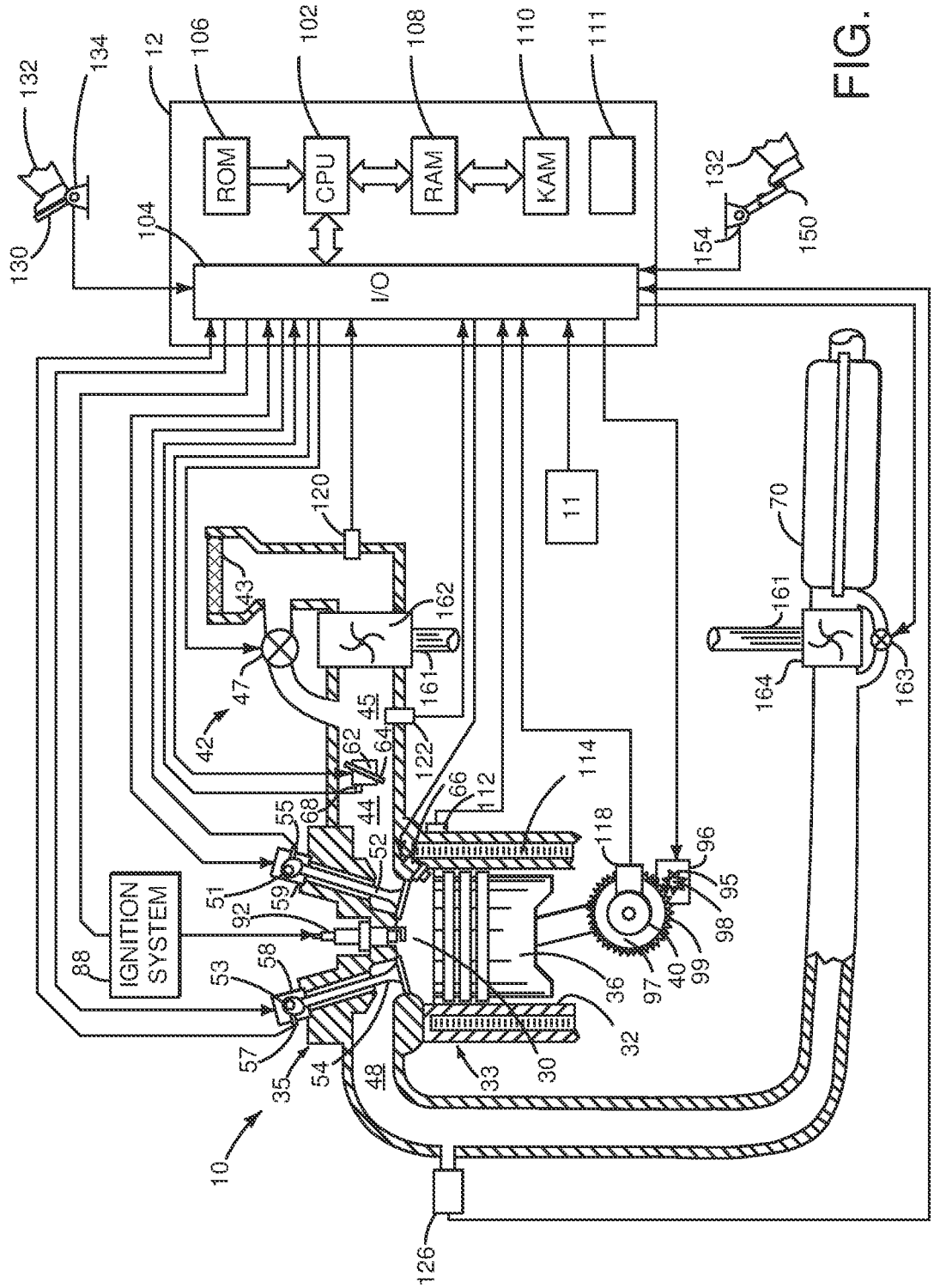
FIG. 1 is a schematic diagram of an engine.

Referring to FIG. 1, internal combustion engine 10, comprising a plurality of cylinders, one cylinder of which is shown in FIG. 1, is controlled by electronic engine controller 12. Controller 12 receives signals from the various sensors shown in FIGS. 1 and 2. Further, controller 12 employs the actuators shown in FIGS. 1 and 2 to adjust engine operation based on the received signals and instructions stored in non-transitory memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 may also include one or more timers and/or counters 111 that keep track of an amount of time between a first event and a second event. The timer and/or counters may be constructed in hardware or software. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a driver demand pedal 130 for sensing force applied by human driver 132; a brake pedal sensor 154 coupled to brake pedal 150 for sensing force applied by human driver 132, a measurement of engine manifold pressure (MAP) from pressure sensor 122 coupled to intake manifold 44; an engine position sensor from an engine position sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start the engine or vehicle may be generated via a human and input to the human/machine interface 11. The human/machine interface may be a touch screen display, pushbutton, key switch or other known device.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Figure 2:
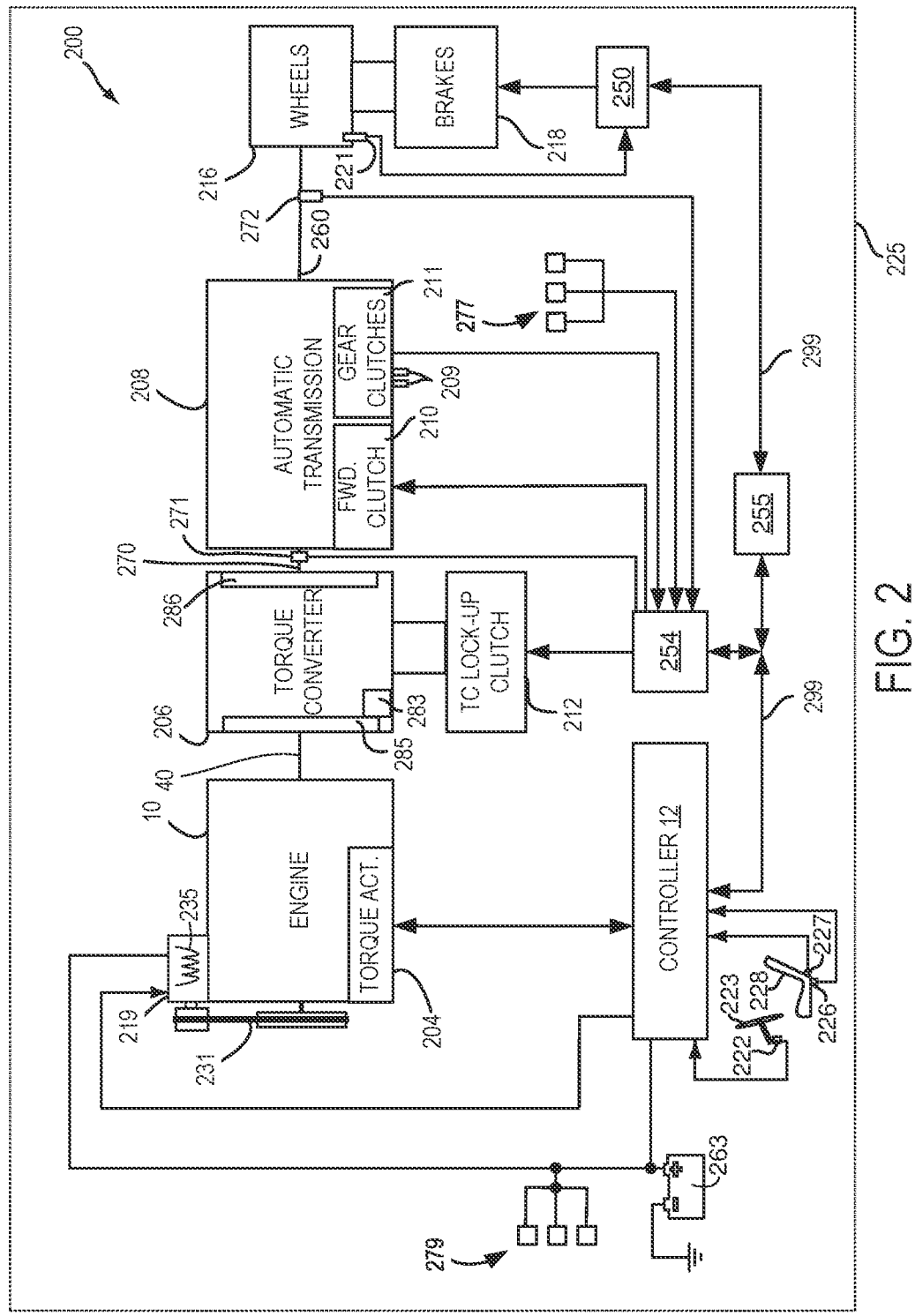
FIG. 2 is a schematic diagram of a vehicle driveline.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, transmission controller 254, and brake controller 250. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), torque output of the device being controlled, sensor and actuator data, diagnostic information (e.g., information regarding a degraded transmission, information regarding a degraded engine, and information regarding degraded brakes). Further, the vehicle system controller 255 may provide commands to engine controller 12, transmission controller 254, and brake controller 250 to achieve driver input requests and other requests that are based on vehicle operating conditions.

For example, in response to a driver releasing a driver demand pedal and vehicle speed, vehicle system controller 255 may request a desired wheel torque or a wheel power level to provide a desired rate of vehicle deceleration. The desired wheel torque may be provided by vehicle system controller 255 requesting a braking torque from brake controller 250, thereby providing the desired braking torque at vehicle wheels 216.

In other examples, the partitioning of controlling powertrain devices may be partitioned differently than is shown in FIG. 2. For example, a single controller may take the place of vehicle system controller 255, engine controller 12, transmission controller 254, and brake controller 250. Alternatively, the vehicle system controller 255 and the engine controller 12 may be a single unit while the transmission controller 254 and the brake controller 250 are standalone controllers.

Engine 10 may be started with an engine starting system shown in FIG. 1. Further, torque of engine 10 may be adjusted via torque actuator 204, such as a fuel injector, throttle, etc. An engine output torque may be transmitted to torque converter 206 via crankshaft 40. Torque converter 206 includes a turbine 286 to output torque to input shaft 270. Input shaft 270 mechanically couples torque converter 206 to automatic transmission 208. Torque converter 206 also includes a torque converter lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft 270 of automatic transmission 208. Alternatively, the torque converter lock-up clutch 212 may be partially engaged, thereby enabling the amount of torque directly relayed to the transmission to be adjusted. The transmission controller 254 may be configured to adjust the amount of torque transmitted by torque converter 206 by adjusting the torque converter lock-up clutch 212 in response to various engine operating conditions, or based on a driver-based engine operation request.

Torque converter 206 also includes pump 283 that pressurizes fluid to operate forward clutch 210 and gear clutches 211. Pump 283 is driven via impeller 285, which rotates at a same speed as crankshaft 40.

Automatic transmission 208 includes gear clutches (e.g., gears 1-10) 211 and forward clutch 210. Automatic transmission 208 is a fixed ratio transmission. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Torque output from the automatic transmission 208 may also be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216. Transmission controller 254 selectively activates or engages torque converter lock-up clutch 212, gear clutches 211, and forward clutch 210. Transmission controller also selectively deactivates or disengages torque converter lock-up clutch 212, gear clutches 211, and forward clutch 210.

Further, a frictional force may be applied to wheels 216 by engaging friction wheel brakes 218. In one example, friction wheel brakes 218 may be engaged in response to the driver pressing his/her foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the driver releasing his/her foot from a brake pedal, brake controller instructions, and/or vehicle system controller instructions and/or information. For example, vehicle brakes may apply a frictional force to wheels 216 via brake controller 250 as part of an automated engine stopping procedure.

In response to a request to accelerate vehicle 225, vehicle system controller may obtain a driver demand torque or power request from an accelerator pedal or other device. Vehicle system controller 255 then allocates the requested driver demand torque to the engine. Vehicle system controller 255 requests the engine torque from engine controller. If the engine torque is less than a transmission input torque limit (e.g., a threshold value not to be exceeded), the torque is delivered to torque converter 206 which then relays at least a fraction of the requested torque to transmission input shaft 270. Transmission controller 254 selectively locks torque converter lock-up clutch 212 and engages gears via gear clutches 211 in response to shift schedules and TCC lockup schedules that may be based on input shaft torque and vehicle speed. In some conditions when it may be desired to charge electric energy storage device (e.g., battery) 263, controller 12 adjusts current supplied to field winding 235 of alternator 219. Alternator 219 converts torque from engine 10 into electrical energy and it supplies the electrical energy to electric energy storage device 263. Electric energy storage device 263 and alternator 219 may provide electrical power to electrical accessories 279, which may include but are not limited to front and rear windshield resistive heaters, vacuum pumps, climate control fans, and lights. Vehicle system controller 255 may request increased engine torque to overcome the charging torque to meet the driver demand torque.

In response to a request to decelerate vehicle 225, vehicle system controller 255 requests a friction braking torque by applying friction brakes 218. Accordingly, torque control of the various powertrain components may be supervised by vehicle system controller 255 with local torque control for the engine 10, automatic transmission 208, and brakes 218 provided via engine controller 12, transmission controller 254, and brake controller 250.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft rate of speed change. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), and ambient temperature sensors.

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255. Brake controller 250 may also provide anti-lock and vehicle stability braking to improve vehicle braking and stability. As such, brake controller 250 may provide a wheel torque limit (e.g., a threshold negative wheel torque not to be exceeded) to the vehicle system controller 255 so that wheels do not lock for an extended period of time.

Controller 12, or alternatively controller 255 may receive position information from steering wheel sensor 222, which provides a position of steering wheel 223. Seat sensors 226 and 227 provide position information of seat 228. The positions indicated by sensors 222, 226, and 227 may be referred to as vehicle driver settings since a driver may adjust positions of seat 228 and steering wheel to suit the driver's comfort. The positions for a particular driver may be stored in controller volatile memory and the positions may be associated with a particular key fob or human/machine interface setting. If the positions of the seat or the steering wheel change from positions stored in memory and that correspond to a particular human driver, then controller 12 or control 255 may determine that a change in state of the vehicle driver settings has been made for a new driver.

The system of FIGS. 1 and 2 is only one example system where the methods described herein may be applied. For example, the methods described herein may apply to parallel and series hybrid and partial hybrid vehicles. Further, the methods described herein may be applied to personal or commercial vehicles including cars and trucks.

Thus, the system of FIGS. 1 and 2 provide for a system, comprising: an internal combustion engine; and a controller including executable instructions stored in non-transitory memory that cause the controller to automatically stop the internal combustion engine according to a comparison between an engine off opportunity and an auxiliary logic performance. In a first example, the system includes where the engine off opportunity is an amount of time that the internal combustion engine would be stopped for a particular set of operating conditions if the internal combustion engine was stopped according to a base routine block that provides an output to an arbitration routine. In a second example that may include the first example, the system includes where the base routine block includes assessments of inviolable conditions for automatically stopping the engine. In a third example that may include one or both of the first and second examples, the system includes where the first auxiliary logic performance is an amount of time that the internal combustion engine would be stopped for a particular set of operating conditions if the internal combustion engine was stopped according to the base routine block and an auxiliary control routine block. In a fourth example that may include one or more of the first through third examples, the system includes where an output of the auxiliary control routine block does not supersede the base routine block preventing automatically stopping the internal combustion engine. In a fifth example that may include one or more of the first through fourth examples, the system includes where the output of the auxiliary control routine block does supersede the base routine block automatically stopping the internal combustion engine. In a sixth example that may include one or more of the first through fifth examples, the system further comprises additional instructions to render an auxiliary control routine block ineffective to automatically stop the internal combustion engine in response to the comparison between the engine off opportunity and the auxiliary logic performance.

Referring now to FIG. 3, a block diagram 300 that shows blocks of software (e.g., controller instructions) for an automatic engine stop/start system is shown. The blocks (e.g., 302-312) represent software instructions that are included in a controller (e.g., 12) for the purpose of issuing or not issuing requests to automatically stop an engine (e.g., stop supplying spark and fuel to an engine without receiving input via a driver (human or autonomous) or vehicle occupant).

Automatic engine stop/start routine 302 includes base routine block 304 that may comprise controller instructions including logic. The base routine block 304 includes inviolable conditions and/or instructions and/or logic that form a basis for when an engine is automatically stopped. The inviolable conditions and/or instructions and/or logic may control when an engine is automatically stopped due to hardware and/or inadvertent operating conditions (e.g., conditions during which automatic engine stop may not be desirable to be active). For example, the base routine block may include instructions similar to:

If (bat_volt>=thresh_bat) then Bat_state=TRUE, else
   Bat_state=FALSE where bat_volt is a variable that represents present battery voltage, thresh_bat is a threshold battery voltage (e.g., 12 volts), Bat_state is a variable that represents an operating state of a vehicle battery, where the battery is operational if Bat_state is TRUE (logical true condition), and where the battery is determined to not be operational if Bat_state is FALSE (logical false condition). The base routine block 304 may judge to automatically stop the engine if Bat_state is TRUE and all other conditions evaluated in base routine block 304 are TRUE. Base routine block 304 may output an indication to automatically stop the engine (e.g., a parameter assigned as TRUE). Base routine block 304 may judge to not automatically stop the engine via outputting an indication to not automatically stop the engine (e.g., a parameter assigned as FALSE). Base routine block 304 may generate a decision whether or not to automatically stop the engine and provide the decision to final arbitration routine block 314 via output 304a. The above instructions may be considered as an evaluation of the inviolable condition of battery voltage being sufficient for the engine to be cranked by a starter.

In this example, block diagram 300 includes three auxiliary control routine blocks 306, 308, and 310. The three auxiliary control routine blocks may comprise controller instructions including logic. Each of the auxiliary control routine blocks 306, 308, and 310 include conditions and/or instructions and/or logic that form alternative basis for when an engine is to be automatically stopped. The conditions and/or instructions and/or logic included in the auxiliary control routine blocks may provide a secondary layer of control for when an engine may be automatically stopped. Output from auxiliary control routine blocks 306, 308, and 310 cannot cause the engine to stop if the base routine block 304 commands the engine to remain running (e.g., rotating and combusting fuel). However, each of auxiliary control routine blocks 306, 308, and 310 may provide individual output that may agree or disagree with the engine stop decision made by base routine block 304. For example, if base routine block 304 makes a decision to automatically stop the engine, one or more of auxiliary control routine blocks may prevent the engine from automatically stopping. If base routine block 304 makes a decision to automatically stop the engine and each of auxiliary control routine blocks 306, 308, and 310 judge to automatically stop the engine, the engine may be automatically stopped. Auxiliary control routine blocks 306, 308, and 310 may include conditions and/or instructions and/or logic to control when an engine is automatically stopped due to conditions other than hardware and/or inadvertent operating conditions. For example, first auxiliary control routine block 306 may include instructions similar to:

If (veh_stop_sgn=TRUE) then Aux_rtn1=FALSE, else Aux_rtn1=TRUE where veh_stop_sgn is a variable that represents whether or not the vehicle that includes the engine is presently stopped for a stop sign (e.g., a condition where the vehicle is expected to be stopped for a short duration, and where stopping the engine may not be beneficial), Aux_rtn1 is a variable that represents whether or not auxiliary control routine block 306 requests an automatic engine stop. Thus, if the variable veh_stop_sgn is TRUE, then the variable Aux_rtn1 is FALSE. If the variable veh_stop_sgn is FALSE, then the variable Aux_rtn1 is TRUE. The auxiliary control routine block 306 is providing an indication that the auxiliary control routine block 306 is requesting an automatic engine stop when the variable Aux_rtn1 is TRUE. The first auxiliary control routine block 306 provides an indication to management system 312 whether or not first auxiliary control routine block 306 is requesting an automatic engine stop via output 306a.

Each of the auxiliary control routine blocks 308 and 310 may include instructions including logic and/or rules similar to those described for the first auxiliary control routine block 306 that may be a basis for the auxiliary control routine blocks 308 and 310 requesting or not requesting an automatic engine stop. The second auxiliary control routine block 308 provides an indication to management system 312 whether or not second auxiliary control routine block 308 is requesting an automatic engine stop via output 308a. The third auxiliary control routine block 310 provides an indication to management system 312 whether or not third auxiliary control routine block 310 is requesting an automatic engine stop via output 310a. In other examples, there may be a greater than three auxiliary control routine blocks or there may be fewer than three auxiliary control routine blocks.

Management system block 312 may comprise controller instructions including logic. In one example, management system block 312 includes controller instructions to benchmark performance of each auxiliary control routine block as described herein with regard to the method of FIG. 7. If management system block 312 judges that one or more auxiliary control routine blocks is not providing a desired level of performance (e.g., not conserving an expected amount of fuel or not reducing engine emissions by an expected amount), management system block 312 will provide output to final arbitration routine block that causes final arbitration routine block to not consider output of the auxiliary control routine block that is not performing as is expected. For example, management system block 312 may issue a substitute command to not automatically stop the engine based on benchmarking of the first auxiliary control routine block 306, or management system block 312 may issue an under evaluation or other similar indication based on benchmarking of the first auxiliary control routine block 306. Conversely, if an auxiliary control routine block is operating as expected, management system block 312 may pass output of the auxiliary control routine block directly to the final arbitration routine block 314.

Final arbitration routine block 314 receives input from the base routine block 304 and the management system block 312 to determine whether or not to request an automatic engine stop. Final arbitration routine block 314 may comprise controller instructions including logic to decide whether or not to request an automatic engine stop. In one example, final arbitration routine block 314 may include controller instructions to not request an automatic engine stop if output of base routine block 304 indicates automatic engine stopping is not to be permitted. Final arbitration routine block 314 may also include controller instructions to not request an automatic engine stop if output of base routine block 304 indicates automatic engine stopping is to be permitted and one or more of auxiliary control routine blocks 306-310 indicate that automatic engine stopping is not to be permitted. Final arbitration routine block 314 may also include controller instructions to request an automatic engine stop if output of base routine block 304 indicates automatic engine stopping is to be permitted and all of auxiliary control routine blocks 306-310 indicate that automatic engine stopping is to be permitted. Final arbitration routine block 314 inhibits or permits automatic engine stopping via output 314a.

Thus, the architecture shown in FIG. 3 permits auxiliary control routine blocks to be added to or removed from the automatic engine stop/start routine 302 by simply adding or removing auxiliary control routine blocks. Further, the architecture provides for a single management system routine that selectively controls flow of automatic engine stop and start requests so that auxiliary control routine blocks that are not performing as may be desired are not considered in the decision as to whether or not to inhibit or permit automatic engine stopping.

Referring now to FIG. 4, a plot illustrating engine off opportunity and auxiliary logic performance is shown. The plots of FIG. 4 show an example automatic engine stop sequence.

The first plot from the top of FIG. 4 is a plot of brake pedal state versus time. The vertical axis represents the brake pedal state and the brake pedal is being applied when trace 402 is at a higher level that is near the vertical axis arrow. The brake pedal is not being applied when trace 402 is at a lower level near the horizontal axis. The horizontal axis represents time and time increases from the left side of the plot to the right side of the plot. Trace 402 represents the brake pedal state.

The second plot from the top of FIG. 4 is a plot of vehicle speed versus time. The vertical axis represents vehicle speed and vehicle speed increases in the direction of the vertical axis arrow. The horizontal axis represents time and time increases from the left side of the plot to the right side of the plot. Trace 404 represents the vehicle speed.

The third plot from the top of FIG. 4 is a plot of engine speed versus time. The vertical axis represents engine speed and engine speed increases in the direction of the vertical axis arrow. The horizontal axis represents time and time increases from the left side of the plot to the right side of the plot. Trace 406 represents the engine speed.

At time t0, the brake pedal is applied and vehicle speed is decreasing. The engine speed is also decreasing as vehicle speed decreases.

At time t1, the vehicle speed reaches zero and the base routine requests an automatic engine stop. However, one or more auxiliary control routines request that the engine remain running (e.g., rotating and combusting fuel). Therefore, the engine speed remains high and the engine continues to operate.

At time t2, the auxiliary control routine inhibiting of automatic engine stopping is withdrawn and the base routine continues to request an automatic engine stop. Therefore, the engine is stopped. The brake pedal remains applied and the vehicle speed remains zero.

At time t3, the brake pedal is released so the base routine withdraws the automatic engine stop request and the auxiliary control routine withdraws its automatic engine stop request. Therefore, the engine is automatically restarted.

In this example, an engine off opportunity is an amount of time between time t1 and time t3. The engine off opportunity is an amount of engine stop time if the engine were stopped according to only the base routine control instructions and not according to auxiliary control routine instructions. The auxiliary logic performance is an amount of engine stop time if the engine were stopped according to only the base routine control instructions and according to auxiliary control routine instructions.

Note that the engine off opportunity is not necessarily an amount of time that the engine actually stops. Rather, it is a modeled quantity that is internal to the management system block. The actual engine stop/start profile is according to output of the final arbitration routine block, which may or may not include input from one or more of the auxiliary control routines.

Referring now to FIG. 5A, a plot 500 showing a relationship between an amount of time that an engine is stopped after being automatically stopped and an amount of fuel savings that result from the automatic engine stop is shown. The vertical axis represents an amount of fuel savings resulting from the automatic engine stop. Fuel savings amounts above the horizontal axis are positive (a reduction in fuel consumption) and fuel savings amounts below the horizontal axis are negative (an increase in fuel consumption). The amount of time that the engine is stopped increases from the left side of the plot to the right side of the plot.

Line 504 shows the relationship between the amount of time that an engine is stopped after being automatically stopped and an amount of fuel savings that result from the automatic engine stop. Vertical line 502 represents a breakeven point where the amount of fuel saved by stopping the engine is equal to the amount of fuel consumed by the engine if the engine had not been stopped. At times earlier than the time represented by line 502, the amount of fuel used to restart the engine exceeds the amount of fuel to keep the engine running. The amount of fuel conserved at a particular time may be determined by extending a line from line 508 that is parallel to the horizontal axis to the vertical axis as is shown by line 506.

Referring now to FIG. 5B, a plot 500 showing a relationship between an amount of time that an engine is stopped after being automatically stopped and an amount of engine emissions savings that result from the automatic engine stop is shown. The vertical axis represents an amount of engine emissions resulting from the automatic engine stop. Engine emissions savings amounts above the horizontal axis are positive (a reduction in engine emissions) and engine emissions savings amounts below the horizontal axis are negative (an increase in engine emissions). The amount of time that the engine is stopped increases from the left side of the plot to the right side of the plot.

Line 554 shows the relationship between the amount of time that an engine is stopped after being automatically stopped and an amount of engine emissions savings that result from the automatic engine stop. Vertical line 552 represents a breakeven point where the amount of engine emissions saved by stopping the engine is equal to the amount of engine emissions generated by the engine if the engine had not been stopped. At times earlier than the time represented by line 552, the amount of engine emissions generated during engine restarting exceeds the amount of emissions generated when the engine is kept running. The amount of engine emissions conserved at a particular time may be determined by extending a line from line 558 that is parallel to the horizontal axis to the vertical axis as is shown by line 556.

Referring now to FIG. 6, an example sequence that illustrates how auxiliary control routine blocks may be managed to control automatic engine stopping according to the method of FIG. 7. The sequence of FIG. 6 may be generated by the system of FIGS. 1 and 2 in cooperation with the method of FIG. 7. The vertical lines at times t0-t13 represent times of interest during the sequence.

The first plot from the top of FIG. 6 is a plot of a benchmark score for a first auxiliary control routine block versus time. The vertical axis represents the benchmark score for a first auxiliary control routine block. In this example, the benchmark score is a value of one if fuel is expected to be conserved by activating the first auxiliary control routing block and the benchmark score value is a value of minus one if extra fuel is expected to be consumed by activating the first auxiliary control routine block. However, in other examples, the benchmark scores may be proportional to amounts of fuel consumed or saved. The horizontal axis represents time and time increases from the left side of the figure to the right side of the figure. Solid line 602 represents the benchmark score for the first auxiliary control routine block.

The second plot from the top of FIG. 6 is a plot of a benchmark score for a second auxiliary control routine block versus time. The vertical axis represents the benchmark score for a second auxiliary control routine block. In this example, the benchmark score is a value of one if fuel is expected to be conserved by activating the second auxiliary control routing block and the benchmark score value is a value of minus one if extra fuel is expected to be consumed by activating the second auxiliary control routine block. However, in other examples, the benchmark scores may be proportional to amounts of fuel consumed or saved. The horizontal axis represents time and time increases from the left side of the figure to the right side of the figure. Solid line 604 represents the benchmark score for the second auxiliary control routine block.

The third plot from the top of FIG. 6 is a plot of an activation state of the first auxiliary control routine block versus time. The vertical axis represents the activation state of the first auxiliary control routine block and the first auxiliary control routine block is activated (output of the first auxiliary control routine block is applied by the arbitration routing block to decide whether or not to automatically stop the engine) when trace 606 is at a high level near the vertical axis arrow. The first auxiliary control routine block is not activated (output of the first auxiliary control routine block is not applied by the arbitration routing block to decide whether or not to automatically stop the engine) when trace 606 is at a low level near the horizontal axis. The horizontal axis represents time and time increases from the left side of the figure to the right side of the figure. Trace 606 represents the activation state of the first auxiliary control routine block.

The fourth plot from the top of FIG. 6 is a plot of an activation state of the second auxiliary control routine block versus time. The vertical axis represents the activation state of the second auxiliary control routine block and the second auxiliary control routine block is activated (output of the second auxiliary control routine block is applied by the arbitration routing block to decide whether or not to automatically stop the engine) when trace 608 is at a high level near the vertical axis arrow. The second auxiliary control routine block is not activated (output of the second auxiliary control routine block is not applied by the arbitration routing block to decide whether or not to automatically stop the engine) when trace 608 is at a low level near the horizontal axis. The horizontal axis represents time and time increases from the left side of the figure to the right side of the figure. Trace 608 represents the activation state of the second auxiliary control routine block.

The fifth plot from the top of FIG. 6 is a plot that indicates which of the auxiliary control routine blocks are active and considered by the arbitration routine block in deciding whether or not to automatically stop the engine. The vertical axis represents which of the auxiliary control routine blocks are active and considered by the arbitration routine block in deciding whether or not to automatically stop the engine. The horizontal axis represents time and time increases from the left side of the figure to the right side of the figure. Trace 610 represents which of the auxiliary control routine blocks are active and considered by the arbitration routine block in deciding whether or not to automatically stop the engine.

At time t0, both the first and second auxiliary control routine blocks are activated and they are both considered in the automatic engine stopping decision. The benchmark scores for the first and second auxiliary control routine blocks are positive, thereby indicating that the auxiliary control routine blocks have a positive effect on fuel economy.

At time t1, both the first and second auxiliary control routine blocks remain activated and output of both blocks is considered in the automatic engine stopping decision. The benchmark score for the first auxiliary control routine switches to a negative value and the benchmark score for the second auxiliary control routine block remains a positive value. However, the first auxiliary control routine block remains active because the average value of the first auxiliary control routine (not shown) remains positive.

At time t2, both the first and second auxiliary control routine blocks remain activated and output of both blocks is considered in the automatic engine stopping decision. The benchmark score for the first auxiliary control routine switches back to a positive value and the benchmark score for the second auxiliary control routine block remains a positive value.

At time t3, both the first and second auxiliary control routine blocks remain activated and output of both blocks is considered in the automatic engine stopping decision. The benchmark score for the first auxiliary control routine and the benchmark score for the second auxiliary control routine block switch to negative values. However, the first and second auxiliary control routine blocks remain active because the average values of the first and second auxiliary control routines (not shown) remain positive.

At time t4, both the first and second auxiliary control routine blocks remain activated and output of both blocks is considered in the automatic engine stopping decision. The benchmark score for the first auxiliary control routine remains negative and the benchmark score for the second auxiliary control switches back to a positive value. Nevertheless, the first and second auxiliary control routine blocks remain active because the average values of the first and second auxiliary control routines (not shown) remain positive.

At time t5, the first auxiliary routine block is deactivated as indicted by the first auxiliary routine state and the second auxiliary control routine blocks remains activated. Output of the first auxiliary routine block is not considered in the automatic engine stopping decision and output of the second auxiliary routine block is considered in the automatic engine stopping decision. The benchmark score for the first auxiliary control routine remains negative and the benchmark score for the second auxiliary control is a positive value.

At time t6, the first auxiliary routine block remains deactivated as indicted by the first auxiliary routine state and the second auxiliary control routine blocks remains activated. Therefore, output of the first auxiliary routine block is not considered in the automatic engine stopping decision and output of the second auxiliary routine block is considered in the automatic engine stopping decision. The benchmark score for the first auxiliary control routine remains flips back positive and the benchmark score for the second auxiliary control remains a positive value.

At time t7, the first auxiliary control routine block is reactivated and second auxiliary control routine blocks remains activated. Output of both auxiliary blocks is again considered in the automatic engine stopping decision. The benchmark score for the first auxiliary control routine remains positive and the benchmark score for the second auxiliary control routine remains a positive value. The first auxiliary control routine block is reactivated because its average value (not shown) returns to a positive value. The second auxiliary control routine block remains active because its average (not shown) remains positive.

At time t8, both the first and second auxiliary control routine blocks remain activated and output of both blocks is considered in the automatic engine stopping decision. The benchmark score for the first auxiliary control routine remains positive and the benchmark score for the second auxiliary control switches to a negative value. Nevertheless, the first and second auxiliary control routine blocks remain active because the average values of the first and second auxiliary control routines (not shown) remain positive.

At time t9, the second auxiliary routine block is deactivated as indicted by the second auxiliary routine state and the first auxiliary control routine blocks remains activated. The output of the second auxiliary routine block is not considered in the automatic engine stopping decision and output of the first auxiliary routine block is considered in the automatic engine stopping decision. The benchmark score for the first auxiliary control routine remains positive and the benchmark score for the second auxiliary control remains a negative value.

At time t10, the first auxiliary control routine block remains activated and the second auxiliary control routine block remains deactivated. The benchmark score for the first auxiliary control routine switches negative and the benchmark score for the second auxiliary control routine block remains a negative value. The first auxiliary control routine block remains active and the second auxiliary control routine block remains deactivated because the average value of the first auxiliary control routine (not shown) is positive and the average value of the second auxiliary control routine (not shown) remains negative.

At time t11, the first auxiliary routine block is deactivated as indicted by the first auxiliary routine state and the second auxiliary control routine blocks remains deactivated. Output of the first auxiliary control routine block is not considered in the automatic engine stopping decision and output of the second auxiliary routine block is not considered in the automatic engine stopping decision. The benchmark score for the first auxiliary control routine remains negative and the benchmark score for the second auxiliary control remains a negative value.

At time t12, both the first and second auxiliary control routine blocks remain deactivated and output of both blocks are not considered in the automatic engine stopping decision. The benchmark score for the first auxiliary control routine remains negative and the benchmark score for the second auxiliary control switches back to a positive value. The first and second auxiliary control routine blocks remain deactivated because the average values of the first and second auxiliary control routines (not shown) remain negative.

At time t13, the second auxiliary control routine block is reactivated and first auxiliary control routine blocks remains deactivated. Output of the first auxiliary control routine block is again considered in the automatic engine stopping decision, but output of the second auxiliary control routine block is not considered in the automatic engine stopping decision. The benchmark score for the second auxiliary control routine remains positive and the benchmark score for the first auxiliary control routine remains a negative value. The second auxiliary control routine block is reactivated because its average value (not shown) returns to a positive value. The first auxiliary control routine block remains deactivated because its average (not shown) remains negative.

In this way, outputs of auxiliary control routine blocks may be selectively considered in the automatic engine stopping decision process. The auxiliary control routine blocks may be selectively activated and deactivated according to averaged values of benchmark scores for the individual auxiliary control routine blocks.

Referring now to FIG. 7, a flow chart of a method for operating a vehicle that includes an engine with automatic stopping and starting capability is shown. The method of FIG. 7 may be incorporated into and may cooperate with the system of FIGS. 1 and 2. Further, at least portions of the method of FIG. 7 may be incorporated as executable instructions stored in non-transitory memory while other portions of the method may be performed via a controller transforming operating states of devices and actuators in the physical world.

At 702, method 700 determines operation conditions. Operating conditions may include but are not limited to vehicle speed, battery SOC, battery health value, battery current, battery voltage, engine load, driver demand torque or power, and engine operating state. The operating conditions may be determined via inputs to the controller. Method 700 proceeds to 704.

At 704, method 700 estimates an engine off opportunity time from a model according to instructions and conditions of the base routine block (e.g., 304 of FIG. 3). In one example, expected operating conditions for an upcoming vehicle stop and projected engine stop are input into the instructions of the base routine block. The base routine block outputs an automatic engine stop command and the base routine block withdraws the automatic engine stop command according to the expected operating conditions. The amount of time between the automatic engine stop command and withdrawal of the automatic engine stop command is recorded as the engine off opportunity time. The expected operating conditions may include a time vector, a data vector describing a distance to an object that the vehicle stop is based upon (e.g., a distance to a stop sign or stop light), data vectors describing states of devices that are external to the vehicle that may be a basis for stopping the vehicle, and data vectors of vehicle operating conditions (e.g., battery state of charge, battery voltage, starter state, etc.). The data vectors may be generated from data cataloged from prior trips and/or from vehicle operating conditions and conditions that are external to the vehicle (e.g., objects sensed via camera or LIDAR). In this way, method 700 may estimate the engine off opportunity time ahead of an actual engine stop.

In other examples, method 700 may feed real-time vehicle data and external observations (e.g., data from a camera or LIDAR) into the instructions of the base routine to determine the engine off opportunity time. Method 700 may capture or record the amount of time between the automatic engine stop command and withdrawal of the automatic engine stop command as the engine off opportunity time according to the output of the base routine block. Method 700 proceeds to 706 after the engine off opportunity (EOO) time is determined or estimated.

At 706, method 700 may determine or estimate auxiliary logic performance times for each auxiliary control routine block. Thus, if the engine system includes four auxiliary control routine blocks, method 700 generates four auxiliary logic performance times.

In one example, method 700 estimates each auxiliary logic performance time from a model according to instructions and conditions of an auxiliary control routine block (e.g., 306 of FIG. 3). Thus, a first auxiliary logic performance time may be generated from a first auxiliary control routine block. In one example, expected operating conditions for an upcoming vehicle stop and projected engine stop are input into the instructions of the subject auxiliary control routine block. The subject auxiliary control routine outputs an automatic engine stop command and the subject auxiliary control routine withdraws the automatic engine stop command according to the expected operating conditions. The amount of time between the automatic engine stop command and withdrawal of the automatic engine stop command is recorded as the auxiliary logic performance time for the subject auxiliary control routine block. The expected operating conditions may include a time vector, a data vector describing a distance to an object that the vehicle stop is based upon (e.g., a distance to a stop sign or stop light), data vectors describing states of devices that are external to the vehicle that may be a basis for stopping the vehicle, and data vectors of vehicle operating conditions (e.g., battery state of charge, battery voltage, starter state, etc.). The data vectors may be generated from data cataloged from prior trips and/or from vehicle operating conditions and conditions that are external to the vehicle (e.g., objects sensed via camera or LIDAR). In this way, method 700 may estimate each of the auxiliary logic performance times ahead of an actual engine stop.

In other examples, method 700 may feed real-time vehicle data and external observations (e.g., data from a camera or LIDAR) into the instructions of each auxiliary control routine to determine the auxiliary logic performance time. Method 700 may capture or record the amount of time between the automatic engine stop command and withdrawal of the automatic engine stop command as the auxiliary logic performance time of the subject auxiliary control routine. Method 700 proceeds to 708 after each auxiliary logic performance (ALP) time is determined or estimated.

At 708, method 700 may generate benchmark scores for each auxiliary control routine. In one example, method 700 evaluates the base routine and each of the auxiliary control routines to generate benchmark scores.

In one example, method 700 compares engine off opportunity time and auxiliary logic performance time to a breakeven point of a relationship between engine off time and fuel savings (e.g., FIG. 5A). Alternatively or in addition, method 700 may compare engine off opportunity time and auxiliary logic performance time to a breakeven point of a relationship between engine off time and engine emissions savings (e.g., FIG. 5B). Engine off opportunity time and auxiliary logic performance time may be deemed positive if the engine off opportunity time and the auxiliary logic performance time are greater than or longer than the breakeven time of the relationship between engine off time and engine fuel savings. Engine off opportunity (EEO) time and auxiliary logic performance (ALP) time may be deemed negative if the engine off opportunity time and the auxiliary logic performance time are less than or shorter than the breakeven time of the relationship between engine off time and engine fuel savings. Four states may result from this convention: 1. EOO is positive, ALP is positive: having the auxiliary logic enabled would not have negative impact compared to the base stop-start logic. This is a neutral score on the benchmark value (e.g., 0); 2. EOO is positive, ALP is negative: having the auxiliary logic enabled would have negative impact on the base stop-start logic. This is a negative score on the benchmark value (e.g., −1); 3. EOO is negative, ALP is positive: having the auxiliary logic enabled would have positive impact on the base stop-start logic. This is a positive score on the benchmark value (e.g., +1); 4. EOO is negative, ALP is negative: Having the auxiliary logic enabled would not have negative impact compared to the base stop-start logic. This is a neutral score on the benchmark value (e.g., 0).

Method 700 may average a plurality of benchmark values (e.g., five) for a particular auxiliary control routine and record the average. Alternatively, method 700 may generate a cumulative running score for each auxiliary control routine block. If the cumulative score is consistently negative, as judged by rolling average, median, or other score aggregation means for an auxiliary control routine block, then the management system may judge that this auxiliary control routine block is not performing to expectations. It should be appreciated that other more or less complicated benchmarking systems based on EOO and ALP are also possible.

For systems that have more than one piece of auxiliary control routine and the control routine has complex interactions with other control routines, then it may be desirable to create similar ALP benchmarks where the management system models combinations of auxiliary control routines. For example, if there are two auxiliary control routine blocks, then an ALP may be needed that models and calculates the engine stop time as if the base logic and both auxiliary logic blocks are active. Method 700 proceeds to 710 after the benchmark values for the auxiliary control routines have been determined.

At 710, method 700 activates or deactivates auxiliary control routines by permitting or preventing their outputs to be supplied to a final arbitration routine. Auxiliary control routines that are active may be auxiliary control routines that have positive average benchmark values, and outputs of the active auxiliary control routines may be passed directly to a final arbitration routine. Auxiliary control routines that are not active may be auxiliary control routines that have negative average benchmark values, and method 700 may supply values or variables to the final arbitration routine that are other than those that are output by the auxiliary control routine that is being deactivated. In other words, method 700 may substitute variables that are passed to the final arbitration routine for auxiliary control routines that are rendered temporarily inactive so that the deactivated auxiliary control routine does not influence the automatic engine stop decision that is made by the final arbitration routine. Method 700 proceeds to 712.

At 712, method 700 may request or withdrawal an automatic engine stop request via a final arbitration routine. In one example, the final arbitration routine may not request an automatic engine stop if the base routine does not permit the automatic engine stop. The final arbitration routine may or may not request an automatic engine stop if the base routine does permit an automatic engine stop. The final arbitration routine may decide whether or not to request an automatic engine stop based on output of the base routine and the outputs of the plurality of auxiliary control routines that are active. If method 700 decides to request an automatic engine stop, method 700 ceases supplying fuel to the engine. If method 700 decides to withdrawal the request to automatically stop the engine, method 700 cranks the engine via a starter and supplies fuel to the engine. Method 700 may also supply spark to spark ignition engines. Method 700 proceeds to exit.

Thus, method 700 provides for a method for operating an engine, comprising: providing a plurality of auxiliary control routine blocks and selectively inhibiting an output of each of the plurality of auxiliary control routine blocks from influencing an automatic engine stop decision generated via an arbitration routine; and inhibiting or permitting automatic stopping of the engine according to the automatic engine stop decision generated via the arbitration routine. In a first example, the method includes where selectively inhibiting the output of each of the plurality of auxiliary control routine blocks includes passing a substitute variable for each of the plurality of auxiliary control routine blocks to the arbitration routine. In a second example that may include the first example, the method further comprises providing a base routine block that provides an output to the arbitration routine. In a third example that may include one or both of the first and second examples, the method includes where the base routine block includes assessments of inviolable conditions for automatically stopping the engine. In a fourth example that may include one or more of the first through third examples, the method includes where the inviolable conditions include a threshold battery voltage being present. In a fifth example that may include one or more of the first through fourth examples, the method includes where selectively inhibiting the output includes inhibiting the output based on a vehicle emissions estimate. In a sixth example that may include one or more of the first through fifth examples, the method includes where selectively inhibiting the output includes inhibiting the output based on a vehicle fuel consumption estimate. In a seventh example that may include one or more of the first through sixth examples, the method includes where selectively inhibiting the output includes inhibiting the output based on an engine off opportunity assessment.

Method 700 also provides for a method for operating an engine, comprising: selectively permitting automatic stopping of the engine based on an output of an auxiliary control routine block via a controller; and inhibiting permitting of automatic stopping of the engine based on an auxiliary logic performance of the auxiliary control routine via the controller. In a first example, the method includes where inhibiting permitting automatic stopping of the engine further includes providing a substitute variable to an arbitration routine based on the auxiliary logic performance of the auxiliary control routine. In a second example that may include the first example, the method further comprises providing the output of the auxiliary control routine block to the arbitration routine. In a third example that may include one or both of the first and second example, the method includes where the auxiliary logic performance is an amount of time. In a fourth example that may include one or more of the first through third examples, the method includes where the auxiliary logic performance is modeled.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating an engine, comprising:
   during engine operation:
   providing a plurality of auxiliary control routine blocks;
   determining at least one of the plurality of auxiliary control routine blocks does not provide a desired level of performance, and determining a remainder of the plurality of auxiliary control routine blocks provides the desired level of performance;
   selectively and temporarily inhibiting an output of each of the at least one of the plurality of auxiliary control routine blocks that was determined not to provide the desired level of performance from influencing an automatic engine stop decision generated via an arbitration routine; and
   inhibiting or permitting automatic stopping of the engine from the engine operating according to the automatic engine stop decision generated via the arbitration routine based on output from the remainder of the plurality of auxiliary control routine blocks determined to provide the desired level of performance.

2. The method of claim 1, where selectively inhibiting the output of each of the plurality of auxiliary control routine blocks includes passing a substitute variable for each of the plurality of auxiliary control routine blocks to the arbitration routine.

3. The method of claim 1, further comprising providing a base routine block that provides an output to the arbitration routine.

4. The method of claim 3, where the base routine block includes assessments of inviolable conditions for automatically stopping the engine.

5. The method of claim 4, where the inviolable conditions include a threshold battery voltage being present.

6. The method of claim 1, where selectively inhibiting the output includes inhibiting the output based on a vehicle emissions estimate.

7. The method of claim 1, where selectively inhibiting the output includes inhibiting the output based on a vehicle fuel consumption estimate.

8. The method of claim 1, where selectively inhibiting the output includes inhibiting the output based on an engine off opportunity assessment.

9. A system, comprising:
   an internal combustion engine; and
   a controller including executable instructions stored in non-transitory memory that cause the controller to automatically stop the internal combustion engine according to a comparison between an engine off opportunity and an auxiliary logic performance, wherein the auxiliary logic performance has been judged via the controller to provide a desired level of performance prior to the comparison.

10. The system of claim 9, where the engine off opportunity is an amount of time that the internal combustion engine would be stopped for a first particular set of operating conditions if the internal combustion engine was stopped according to a base routine block that provides an output to an arbitration routine.

11. The system of claim 10, where the base routine block includes assessments of inviolable conditions for automatically stopping the engine.

12. The system of claim 10, where the auxiliary logic performance is an amount of time that the internal combustion engine would be stopped for a second particular set of operating conditions if the internal combustion engine was stopped according to the base routine block and an auxiliary control routine block.

13. The system of claim 12, where an output of the auxiliary control routine block does not supersede the base routine block preventing automatically stopping the internal combustion engine.

14. The system of claim 13, where the output of the auxiliary control routine block does supersede the base routine block automatically stopping the internal combustion engine.

15. The system of claim 9, further comprising additional instructions to render an auxiliary control routine block ineffective to automatically stop the internal combustion engine in response to the comparison between the engine off opportunity and the auxiliary logic performance.

* * * * *